United States Patent
Yadav et al.

(10) Patent No.: US 11,545,144 B2
(45) Date of Patent: Jan. 3, 2023

(54) SYSTEM AND METHOD SUPPORTING CONTEXT-SPECIFIC LANGUAGE MODEL

(71) Applicant: Samsung Electronics Co., Ltd., Suwon-si (KR)

(72) Inventors: Anil Yadav, Cupertino, CA (US); Mohammad Moazzami, San Jose, CA (US); Allan Jay Schwade, Santa Cruz, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 16/261,430

(22) Filed: Jan. 29, 2019

(65) Prior Publication Data

US 2020/0035230 A1 Jan. 30, 2020

Related U.S. Application Data

(60) Provisional application No. 62/711,407, filed on Jul. 27, 2018.

(51) Int. Cl.
*G10L 15/19* (2013.01)
*G10L 15/18* (2013.01)
*G06F 40/247* (2020.01)

(52) U.S. Cl.
CPC ............ *G10L 15/19* (2013.01); *G06F 40/247* (2020.01); *G10L 15/1815* (2013.01)

(58) Field of Classification Search
CPC .. G06F 40/30; G06F 16/3347; G06F 16/3344; G06F 16/24578; G06F 40/247
See application file for complete search history.

(56) References Cited

U.S. PATENT DOCUMENTS

| | | | | |
|---|---|---|---|---|
| 5,428,707 A | * | 6/1995 | Gould | G10L 15/22 704/231 |
| 6,073,091 A | * | 6/2000 | Kanevsky | G10L 15/197 704/9 |
| 8,175,244 B1 | * | 5/2012 | Frankel | H04N 7/15 379/202.01 |
| 8,416,715 B2 | * | 4/2013 | Rosenfeld | H04N 7/147 370/267 |

(Continued)

FOREIGN PATENT DOCUMENTS

| | | |
|---|---|---|
| JP | 2014206642 A | 10/2014 |
| JP | 2016024325 A | 2/2016 |

(Continued)

*Primary Examiner* — Matthew H Baker

(57) ABSTRACT

A method, an electronic device, and computer readable medium is provided. The method includes identifying a frequency of each word that is present within a set of words. The method also includes deriving relatedness values for pairs of words. Each pair of words includes a first word and a second word in the set of words. Each relatedness value corresponds to a respective one of the pairs of words. Each relatedness value is based on the identified frequencies that the first word and the second word of the respective pair of words are present within the set of words. The method further includes generating a matrix representing the relatedness values. The method additionally includes generating a language model that represents relationships between the set of words included in the matrix.

20 Claims, 9 Drawing Sheets

(56) References Cited

U.S. PATENT DOCUMENTS

| | | | | |
|---|---|---|---|---|
| 8,521,526 | B1* | 8/2013 | Lloyd | G10L 15/01 704/236 |
| 8,775,156 | B2* | 7/2014 | Lebeau | G10L 13/00 704/3 |
| 9,405,823 | B2* | 8/2016 | Mamou | G10L 15/26 |
| 9,734,820 | B2* | 8/2017 | Rangarajan Sridhar | G06F 40/58 |
| 10,726,204 | B2* | 7/2020 | Crudele | G06F 40/284 |
| 2005/0102141 | A1 | 5/2005 | Chikuri | |
| 2008/0052078 | A1* | 2/2008 | Bennett | G09B 7/02 704/257 |
| 2009/0240499 | A1* | 9/2009 | Dvir | G10L 15/063 704/246 |
| 2012/0042022 | A1* | 2/2012 | Sheth | H04L 51/52 709/206 |
| 2013/0226580 | A1* | 8/2013 | Witt-Ehsani | H04M 1/72448 704/244 |
| 2013/0246050 | A1* | 9/2013 | Yu | G10L 21/00 704/9 |
| 2014/0067368 | A1* | 3/2014 | Yih | G06F 16/3338 704/9 |
| 2014/0379324 | A1* | 12/2014 | Klapaftis | G06F 40/247 704/9 |
| 2015/0059002 | A1* | 2/2015 | Balram | G06F 1/163 726/28 |
| 2015/0339290 | A1* | 11/2015 | Mueller | G06F 16/3344 704/9 |
| 2016/0132291 | A1* | 5/2016 | Bai | G06F 9/453 715/728 |
| 2016/0132568 | A1* | 5/2016 | Vogel | G06F 16/435 707/728 |
| 2016/0170970 | A1* | 6/2016 | Lindblom | H04L 51/063 704/3 |
| 2016/0253313 | A1* | 9/2016 | Breske | G06F 40/166 704/10 |
| 2018/0308487 | A1* | 10/2018 | Goel | G10L 15/26 |
| 2018/0336902 | A1* | 11/2018 | Cartwright | G10L 17/02 |

FOREIGN PATENT DOCUMENTS

| | | |
|---|---|---|
| KR | 101489606 B1 | 2/2015 |
| KR | 101504212 B1 | 3/2015 |
| KR | 20150056757 A | 5/2015 |

* cited by examiner

SYSTEM AND METHOD SUPPORTING CONTEXT-SPECIFIC LANGUAGE MODEL

CROSS-REFERENCE TO RELATED APPLICATION AND CLAIM OF PRIORITY

This application claims priority under 35 U.S.C. § 119(e) to U.S. Provisional Patent Application No. 62/711,407 filed on Jul. 27, 2018, which is hereby incorporated by reference in its entirety.

TECHNICAL FIELD

This disclosure relates generally to electronic devices. More specifically, this disclosure relates to generating context-specific language models for automatic speech recognition and natural language understanding systems.

BACKGROUND

Methods for interacting with and controlling computing devices are continually improving in order to create more natural interfaces. Many such methods for interacting with and controlling computing devices generally require users to utilize user interface instruments, such as keyboards, mice, or touchscreens. Some electronic devices employ natural language processing that enable users to interact with computing devices via a natural language input. For example, natural language input can include a voice enabled user interface where a user can interact with the computing device by speaking. Natural language processing is becoming the interaction method of choice for some electronic devices and appliances. An electronic device that can interpret the intended meaning of a natural language command and then perform the intended action plays an increasingly important role in consumer satisfaction with respect to artificial intelligent (AI) based system.

SUMMARY

This disclosure provides a system and method supporting a context-specific language model.

In one embodiment, a method includes identifying a frequency of each word that is present within a set of words. The method also includes deriving relatedness values for pairs of words. Each pair of words includes a first word and a second word in the set of words. Each relatedness value corresponds to a respective one of the pairs of words. Each relatedness value is based on the identified frequencies that the first word and the second word of the respective pair of words are present within the set of words. The method further includes generating a matrix representing the relatedness values. The method additionally includes generating a language model that represents relationships between the set of words included in the matrix.

In another embodiment, an electronic device includes at least one processor. The at least one processor is configured to identify a frequency of each word that is present within a set of words. The at least one processor is also configured to derive relatedness values for pairs of words. Each pair of words includes a first word and a second word in the set of words. Each relatedness value corresponds to a respective one of the pairs of words and is based on the identified frequencies that the first word and the second word of the respective pair of words are present within the set of words. The at least one processor is further configured to generate a matrix representing the relatedness values. The at least one processor is additionally configured to generate a language model that represents relationships between the set of words included in the matrix.

In yet another embodiment, a non-transitory computer readable medium embodies a computer program. The computer program includes computer readable program code that, when executed by at least one processor of an electronic device, causes the at least one processor to identify a frequency of each word that is present within a set of words. The computer program also includes computer readable program code that, when executed, causes the at least one processor to derive relatedness values for pairs of words. Each pair of words includes a first word and a second word in the set of words. Each relatedness value corresponds to a respective one of the pairs of words and is based on the identified frequencies that the first word and the second word of the respective pair of words are present within the set of words. The computer program further includes computer readable program code that, when executed, causes the at least one processor to generate a matrix representing the relatedness values. The computer program additionally includes computer readable program code that, when executed, causes the at least one processor to generate a language model that represents relationships between the set of words included in the matrix.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code"

includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
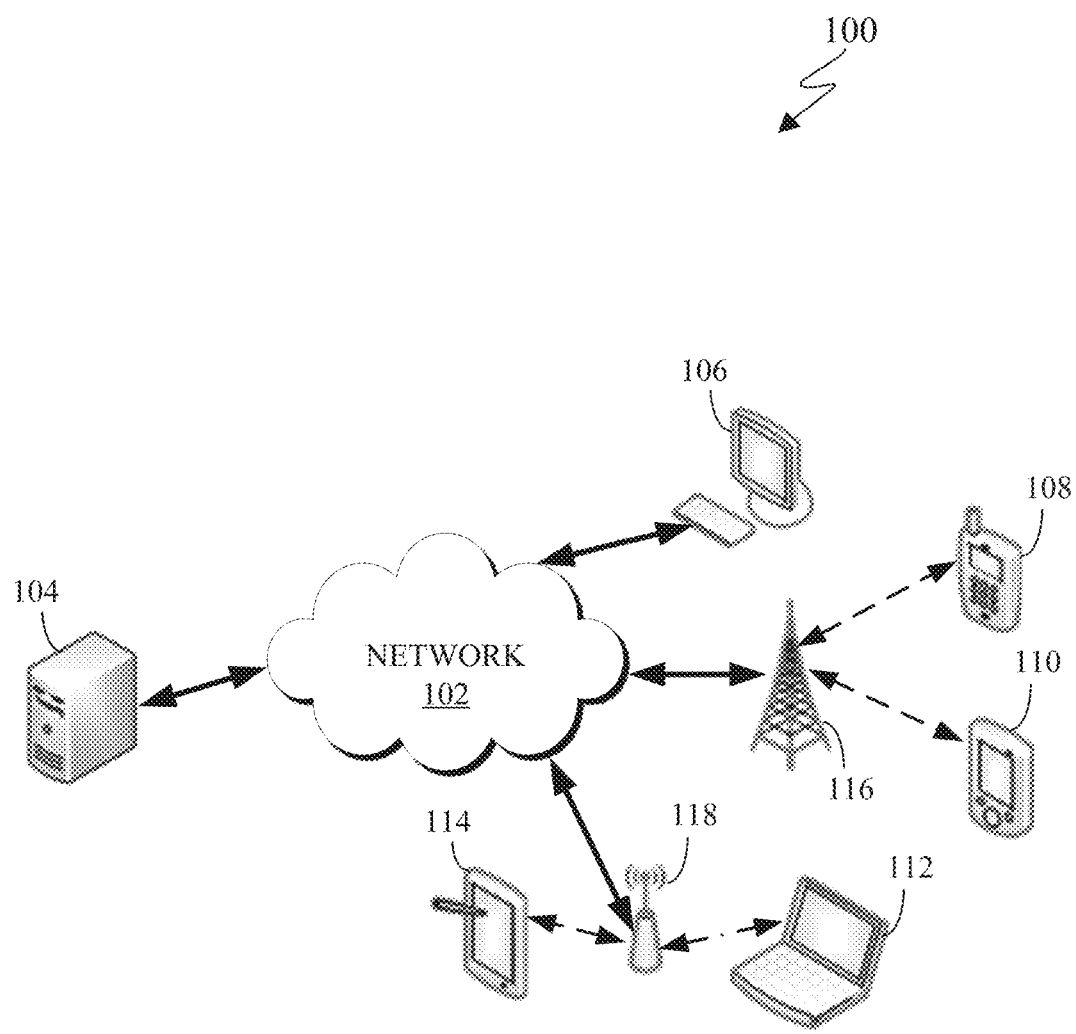
FIG. 1 illustrates an example communication system in accordance with an embodiment of this disclosure.

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably-arranged system or device.

According to embodiments of this disclosure, various systems and methods for controlling and interacting with computing devices are provided. A graphical user interface allows a user to interact with an electronic device, such as a computing device, by enabling the user to locate and select objects on a screen. Common interactions include physical manipulations, such as the user physically typing on a keyboard, moving a mouse, and touching a touchscreen of a touch-sensitive surface, among others. There are instances when utilizing various physical interactions, such as touching a touchscreen, are not feasible, such as when the user wears a head-mounted display or when a device does not include a display. Additionally, there are instances when utilizing various physical interactions, such as touching a touchscreen or using an accessory (like a keyboard, mouse, touch pad, remote, or the like), is inconvenient or cumbersome. Embodiments of this disclosure allow for additional approaches to interact with an electronic device. It should be noted that, as used here, the term "user" may denote a human or another device (such as an artificial intelligent electronic device) using the electronic device.

The electronic device, according to embodiments of this disclosure, can include a personal computer (such as a laptop or a desktop), a workstation, a server, a television, an appliance, a virtual assistant, and the like. Additionally, the electronic device can be at least one part of a piece of furniture or building/structure, an electronic board, an electronic signature receiving device, a projector, or a measurement device. In some embodiments, the electronic device can be a portable electronic device like a portable communication device (such as a smartphone or mobile phone), a laptop, a tablet, an electronic book reader (such as an e-reader), a personal digital assistant (PDA), a portable multimedia player (PMP), an MP3 player, a mobile medical device, a virtual reality headset, a portable game console, a camera, or a wearable device, among others. The electronic device can be one or a combination of the above-listed devices. Additionally, the electronic device as disclosed here is not limited to the above-listed devices and can include new electronic devices depending on the development of technology.

A virtual assistant, a smart assistant, an artificial intelligence (AI) assistant, a smart hub, and the like (collectively referred to here as virtual assistant devices) are a family of devices that can perform various tasks and services for a user. For example, virtual assistant devices can provide a variety of services such as providing the weather, setting an alarm, creating and maintaining a shopping list, playing music, turning on a specific appliance or television program, and switching on/off a smart light bulb, to name a few. A virtual assistant device can often interact with a user through a voice-enabled user interface, such as a natural language processor. A natural language processor is based on language models that enable the virtual assistant device to understand a received natural language input, such as a verbal utterance of the user in order to perform the requested task.

According to embodiments of this disclosure, a natural approach to interacting with and controlling a computing device uses natural language processing. In some embodiments, natural language processing is associated with a typed input or command using natural language. In other embodiments, natural language processing is associated with a voice-enabled user interface. A voice-enabled user interface enables a user to interact with a computing device through the act of speaking. Speaking can include a human speaking directly to the electronic device or another electronic device projecting sound through a speaker. Once the computing device detects and receives the sound, the computing device can derive contextual meaning from the oral command and thereafter perform the requested task. As used here, natural language inputs such as a voice command (a verbal utterance) and a typed input can be used interchangeably. Additionally, it should be noted that natural language inputs are not limited to verbal utterances and typed inputs.

Natural language processing can include natural language understanding (NLU) systems and automatic speech recognition (ASR) systems. In some embodiments, NLU and ASR systems enable the recognition and translation of spoken language into text on a computing device, as well as the ability to both derive and perform an action based on a natural language input. NLU and ASR systems can also include a user interface that performs one or more functions or actions based on the specific instructions received from the user. For example, if a user verbally speaks "call spouse" to a smart phone, the smart phone can identify the task as a request to use the phone function and activate the phone feature of the device, looking up a phone number associated with "spouse," and subsequently dial the phone number of the user's spouse. In another example, a user can speak "what is the weather" to a particular device, and the device can look up the weather based on the location of the user and either display the weather on a display or speak the weather to the user through a speaker. In yet another example, a user can recite "turn on the TV" to an electronic device, and a particular TV will turn on.

Embodiments of this disclosure recognize and take into consideration that different natural language inputs, including verbal utterances (such as words, phrases, sentences, and the like), can have similar meanings. For example, different natural language inputs can have the same meaning, such as the phrases "send a text to Tom," "message Tom," and "shoot a message to Tom." Each of the above phrases instruct an electronic device to transmit a message to a particular individual, but the user who created each command used different words and phrases to indicate the same action. Synonyms for the word "send" can include "consign," "dispatch," "transfer," and "transmit," among others. However, such words do not always fit naturally as a replacement of the word "send," such as in the phrase "send Tom a message."

Similarly, embodiments of this disclosure recognize and take into consideration that the same natural language input can have different meanings based on context. For example, the same word can mean different things based on the context surrounding the word. For instance, when the word "share" is used in the phrase "send a message to mom and share it with dad," the word "share" means to forward the message. In contrast, when the word "share" is used in the phrase of "share my birthday photographs on social media," the word "share" means "post." Therefore, embodiments of this disclosure recognize and take into consideration that a natural language processing system needs to interpret a particular action an electronic device is to perform based on the context surrounding the natural language input.

Embodiments of this disclosure include systems and methods for generating natural language intent levels that classify the meaning of a word based on the context that is associated with an input, such as a verbal utterance. Additionally, embodiments of this disclosure enable scalability to language models to enable integration with new applications by content providers.

FIG. 1 illustrates an example communication system 100 in accordance with an embodiment of this disclosure. The embodiment of the system 100 shown in FIG. 1 is for illustration only. Other embodiments of the system 100 can be used without departing from the scope of this disclosure.

The system 100 includes a network 102 that facilitates communication between various components in the system 100. For example, the network 102 can communicate Internet Protocol (IP) packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head-mounted display (HMD), or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102. In some embodiments, the server 104 is a natural language processing system that can identify natural language inputs of users. In other embodiments, the server 104 generates one or more language models and provides the language model(s) to one or more of the client devices 106-114 that perform natural language processing.

Each client device 106-114 represents any suitable computing or processing device that interacts with at least one server (such as the server 104) or other computing device(s) over the network 102. In this example, the client devices 106-114 include a desktop computer 106, a mobile telephone or mobile device 108 (such as a smartphone), a PDA 110, a laptop computer 112, and a tablet computer 114. However, any other or additional client devices could be used in the system 100. Smartphones represent a class of mobile devices 108 that are handheld devices with mobile operating systems and integrated mobile broadband cellular network connections for voice, short message service (SMS), and Internet data communications. As described in more detail below, an electronic device (such as the desktop computer 106, mobile device 108, PDA 110, laptop computer 112, or tablet computer 114) can include a user interface engine that modifies one or more user interface buttons displayed to a user on a touchscreen.

In this example, some client devices 108-114 communicate indirectly with the network 102. For example, the client devices 108 and 110 (mobile device 108 and PDA 110, respectively) communicate via one or more base stations 116, such as cellular base stations or eNodeBs (eNBs). Also, the client devices 112 and 114 (laptop computer 112 and tablet computer 114, respectively) communicate via one or more wireless access points 118, such as IEEE 802.11 wireless access points. Note that these are for illustration only and that each client device 106-114 could communicate directly with the network 102 or indirectly with the network 102 via any suitable intermediate device(s) or network(s).

In some embodiments, any of the client devices 106-114 transmits information securely and efficiently to another device, such as, for example, the server 104. Also, any of the client devices 106-114 can trigger the information transmission between itself and server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

The processes and systems provided in this disclosure allow for a client device to receive a natural language input such as a verbal utterance from a user and, through natural language processing, identify and understand the received input from the user. In some embodiments, the server 104 or any of the client devices 106-114 can generate a personalized language model for the natural language processing of a client device 106-114 to identify and understand the received input from the user.

Figure 2:
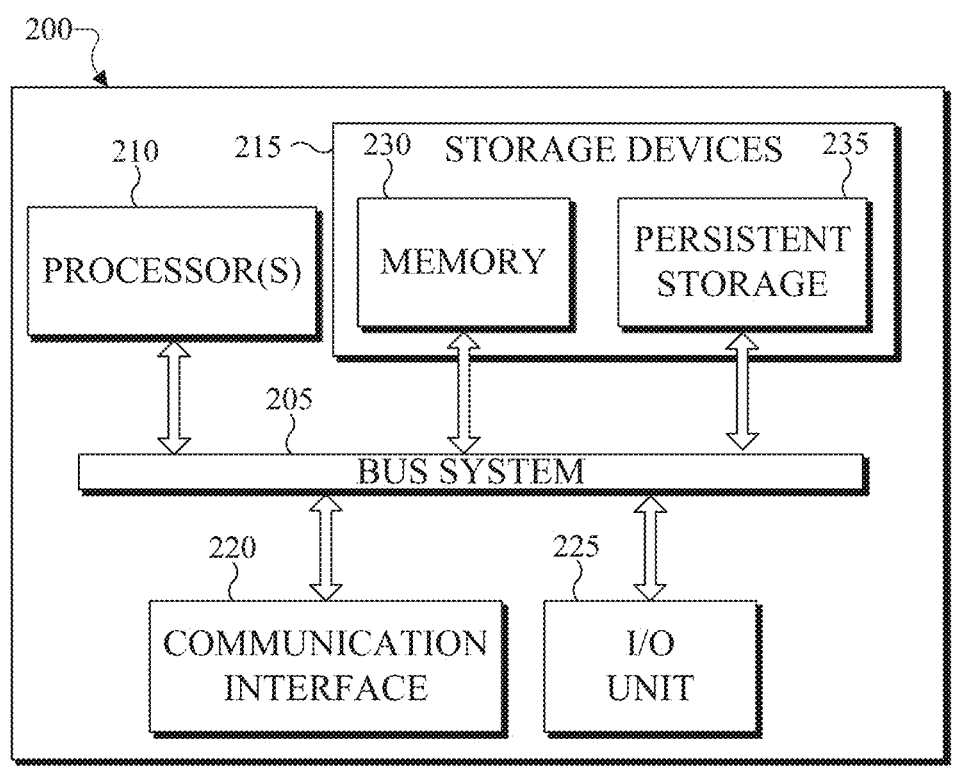
FIGS. 2 and 3 illustrate example electronic devices in accordance with an embodiment of this disclosure.
Figure 3:
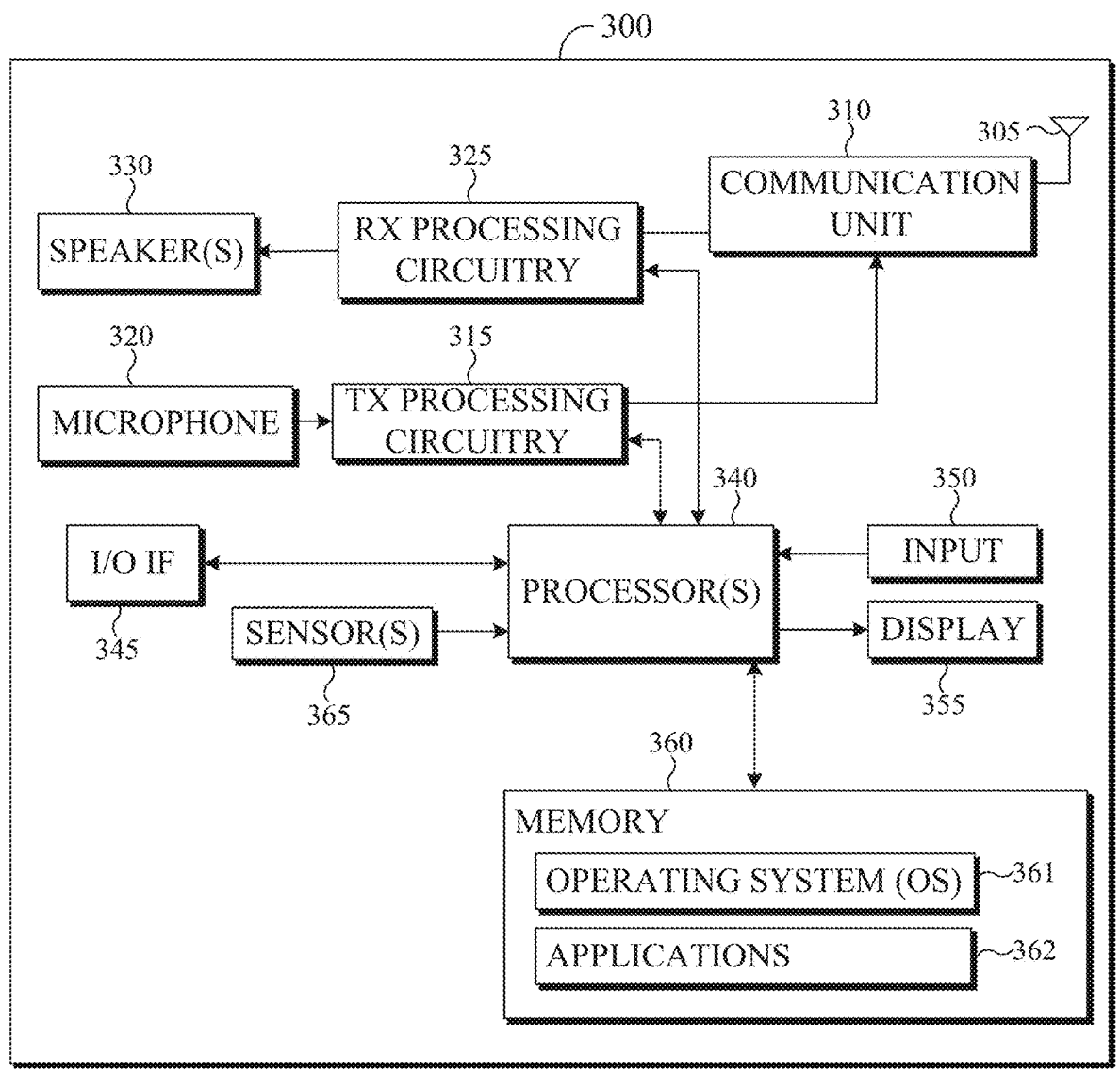

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more local servers, one or more remote servers, clustered computers and components that act as a single pool of seamless resources, a cloud-based server, and the like. The server 200 can be accessed by one or more of the client devices 106-114 of FIG. 1.

As shown in FIG. 2, the server 200 includes a bus system 205 that supports communication between at least one processing device 210, at least one storage device 215, at least one communications interface 220, and at least one input/output (I/O) unit 225. The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102. The communications interface 220 can support communications through any suitable physical or wireless communication link(s).

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-114. For example, a desktop computer 106 or a laptop computer 112 could have the same or similar structure as that shown in FIG. 2.

FIG. 3 illustrates an example electronic device 300, and the electronic device 300 could represent one or more of the client devices 106-114 in FIG. 1. For example, in some embodiments, the electronic device 300 may implement or represent a virtual assistant device that can receive a natural language input such as a verbal utterance, derive meaning from the verbal utterance, and perform an action based on the derived meaning of the verbal utterance. The electronic device 300 can be a mobile communication device, such as, for example, a mobile station, a subscriber station, a wireless terminal, a desktop computer (similar to desktop computer 106 of FIG. 1), a portable electronic device (similar to the mobile device 108, PDA 110, laptop computer 112, or tablet computer 114 of FIG. 1), and the like.

As shown in FIG. 3, the electronic device 300 includes an antenna 305, a communication unit 310, transmit (TX) processing circuitry 315, a microphone 320, and receive (RX) processing circuitry 325. The communication unit 310 can include, for example, a radio frequency (RF) transceiver, a BLUETOOTH transceiver, a WI-FI transceiver, a ZIGBEE transceiver, an infrared transceiver, and the like. The electronic device 300 also includes a speaker 330, a processor 340, an input/output (I/O) interface (IF) 345, an input 350, a display 355, a memory 360, and a sensor(s) 365. The memory 360 includes an operating system (OS) 361 and one or more applications 362.

The communication unit 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The communication unit 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The communication unit 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in a memory 360, such as the OS 361 in order to control the overall operation of the electronic device 300. For example, the processor 340 could control the reception of forward channel signals and the transmission of reverse channel signals by the communication unit 310, the RX processing circuitry 325, and the TX processing circuitry 315 in accordance with well-known principles. The processor 340 can include any suitable number(s) and type(s) of processors or other devices in any suitable arrangement. For example, in some embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive, store, and timely instruct by providing natural language processing and the like. The processor 340 can move data into or out of the memory 360 as required by an executing process. In some embodiments, the processor 340 is configured to execute a plurality of applications 362 based on the OS 361 or in response to signals received from external source(s) or an operator. Example, applications 362 can include a camera application (for still images and videos), a video phone call application, an email client, a social media client, an SMS messaging client, a virtual assistant, and the like. The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with sensor(s) 365 and/or a camera by providing additional input to processor 340. In some embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an air pressure sensor, a magnetic sensor or magnetometer, a grip sensor, a proximity sensor, a color sensor, a biophysical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, and the like. The sensor 365 can further include control circuits for controlling any of the sensors included therein. Any of these sensor(s) 365 can be located within the electronic device 300.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
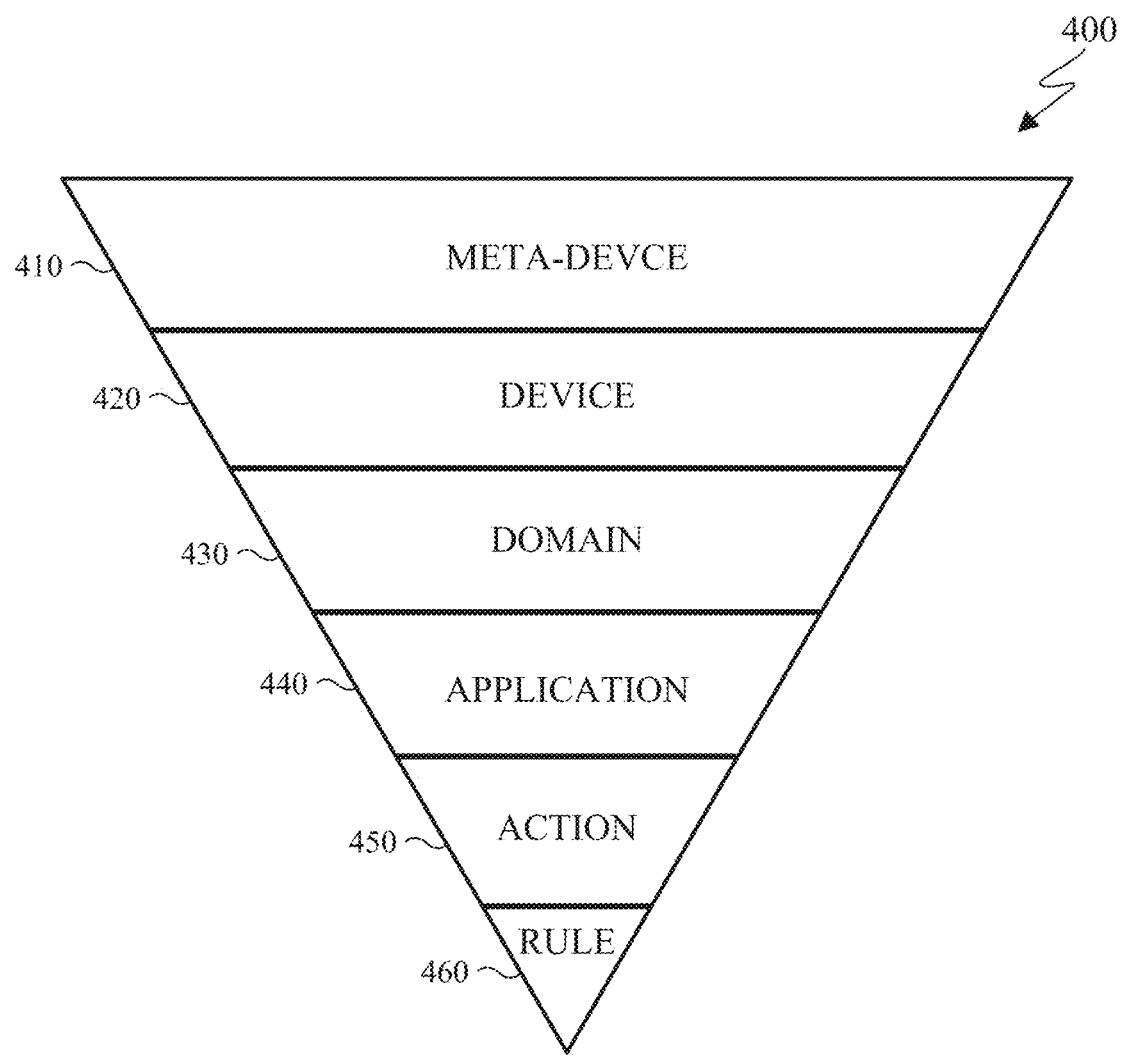
FIG. 4 illustrates an example high-level architecture of various intent spaces in accordance with an embodiment of this disclosure.

FIG. 4 illustrates an example high-level architecture of various intent spaces 400 in accordance with an embodiment of this disclosure. Each of the intent spaces 400 can be associated with a different language model, where each language model is based on a different corpus of natural language inputs, such as different verbal utterances. The embodiment of the intent spaces 400 shown in FIG. 4 is for illustration only. Other embodiments can be used without departing from the scope of this disclosure.

The intent spaces 400 represent a hierarchical scheme that includes multiple levels (or tiers). The intent spaces 400 include multiple intent spaces such as a level that represents a meta-device 410, a level that represents a device 420, a level that represents a domain 430, a level that represents an application 440, a level that represents an action 450, and a level that represents a rule 460. Each subsequent level defines a portion of the previous level. For example, the application 440 represents a single application that is included in the domain 430. Each of the respective levels included in the intent spaces 400 are associated with a corpus of natural language inputs, such as different verbal utterances. One, some, or all of these levels can be included in the intent spaces 400. It should be noted that additional levels can also be defined and included in the intent spaces 400.

Each of the intent spaces 400 invokes a particular set of concepts. The concepts within one of the respective intent spaces 400 limit the corpus of natural language inputs for that particular intent space. A synonym set is a set of words that are associated with a given concept. For example, a single intent space (such as the application 440) can include multiple concepts, where each concept is associated with a particular synonym set. A word list or matrix lexicon encompasses the set of words that are associated with a single intent space, such as the application 440.

The meta-device 410 represents the top level of the intent spaces 400. The meta-device 410 represents one or more levels of abstraction that groups multiple electronic devices that share a similar environment or context, such as electronic devices that are located in a defined area. For example, the meta-device 410 can represent all of the electronic devices in a home of a user. In this example, the electronic devices can include any of the client devices 106-114 of FIG. 1 that are located within the home of the user. Additional electronic devices can include Internet-of-Things (IOT) devices, such as a smart thermostat, a smart appliance, a virtual assistant, and the like. As another example, the meta-device 410 can represent all devices in a particular area of the home of the user, such as the kitchen.

In this example, any of the client devices 106-114 of FIG. 1 (as well as any IOT devices) that are located within the kitchen are included in the meta-device 410. As yet another example, the meta-device 410 can represent a class or type of electronic devices in a particular area, such as appliances in the home of the user.

It should be noted that the corpus of natural language inputs associated with the meta-device 410 is the largest of the intent spaces 400, since the corpus of natural language inputs included in the meta-device 410 includes words or phrases that are associated with all of the lower levels. The corpus of natural language inputs associated with a particular meta-device 410 can be tailored to the specific level of abstraction that groups the electronic devices in the meta-device 410. For example, if the meta-device 410 represents a factory, all of the natural language inputs that can be associated with the factory are included in the corpus of natural language inputs. Alternatively, if the meta-device 410 represents a portion of the factory, the corpus of natural language inputs can be limited to the natural language inputs that are associated with the particular portion of the factory.

The device 420 represents one of the devices within the meta-device 410. In some embodiments, the device 420 can be one of the client devices 106-114 of FIG. 1, the electronic device 300 of FIG. 3, a single IOT device, and the like. The corpus of natural language inputs associated with the device 420 can be specific to the particular device. For example, if the device 420 is an oven in a home of a user, the corpus of natural language inputs can be limited to utterances that a user might speak to an oven. As another example, if the device 420 is a smart phone (similar to the mobile device 108 of FIG. 1), the corpus of natural language inputs can be limited to utterances that a user might speak to a smart phone and any application included in the smart phone.

The domain 430 represents a single class of applications that can be included in the device 420. For example, the domain 430 is a single class of applications, such as applications that can be used in education, entertainment, games, medical, maps and navigation, messaging, news, shopping, social media, travel, and productivity, to name a few. It should be noted that the electronic device 420 can include one or more domains, just as the meta-device 410 can include one or more devices. In some embodiments, a portion of the corpus of natural language inputs can be shared between two or more domains. In other embodiments, the corpus of natural language inputs can vary between different domains. For instance, the word "book" can have different connotations, such as when used in the phrases "book a flight" and "purchase a book." As a result, the corpus of natural language inputs associated with the domain 430 will include the word "book" with one meaning if the domain 430 is associated with travel, while the corpus of natural language inputs associated with the domain 430 will include the word "book" with a different meaning if the domain 430 is associated with shopping. That is, the corpus of natural language inputs can vary based on the particular domain 430.

A single application included in the domain 430 is represented in the level of the application 440. The application 440 may represent one or more applications of the applications 362 of FIG. 3. For example, if the domain 430 is social media, the application 440 is a social media application, such as FACEBOOK, TWITTER, INSTAGRAM, and the like. As another example, if the domain 430 is productivity, the application 440 can be a particular word processing application, a particular spreadsheet application, and the like. The corpus of natural language inputs can vary based on the applications 440.

The action 450 represents a generalized act that is performed based on a received input. In some embodiments, an ASR system interprets the received input and an NLU system performs the interpreted request. The action 450 can be specific to a particular application or shared between multiple applications within a single domain 430. For example, if the domain 430 is social media, the action "TAGGING" can be associated with multiple applications.

The rule 460 provides instructions to the application 440 with respect to how to perform the action 450. For example, the rule 460 represents the specific instructions of how to implement the action 450 with respect to a particular application, such as the application 440. In the previous example of "TAGGING" within the domain 430 of social media, the action 450 of tagging can be performed differently with respect to different applications, such as FACEBOOK and TWITTER. That is, tagging in FACEBOOK is performed a specific way, which can be different than tagging in TWITTER. Therefore, the rule 460 includes the specific instructions to execute the action 450 with respect to the application 440.

Although FIG. 4 illustrates one example of a high-level architecture of various intent spaces 400, various changes may be made to FIG. 4. For example, the high-level architecture can include any suitable number of levels.

Figure 5A:
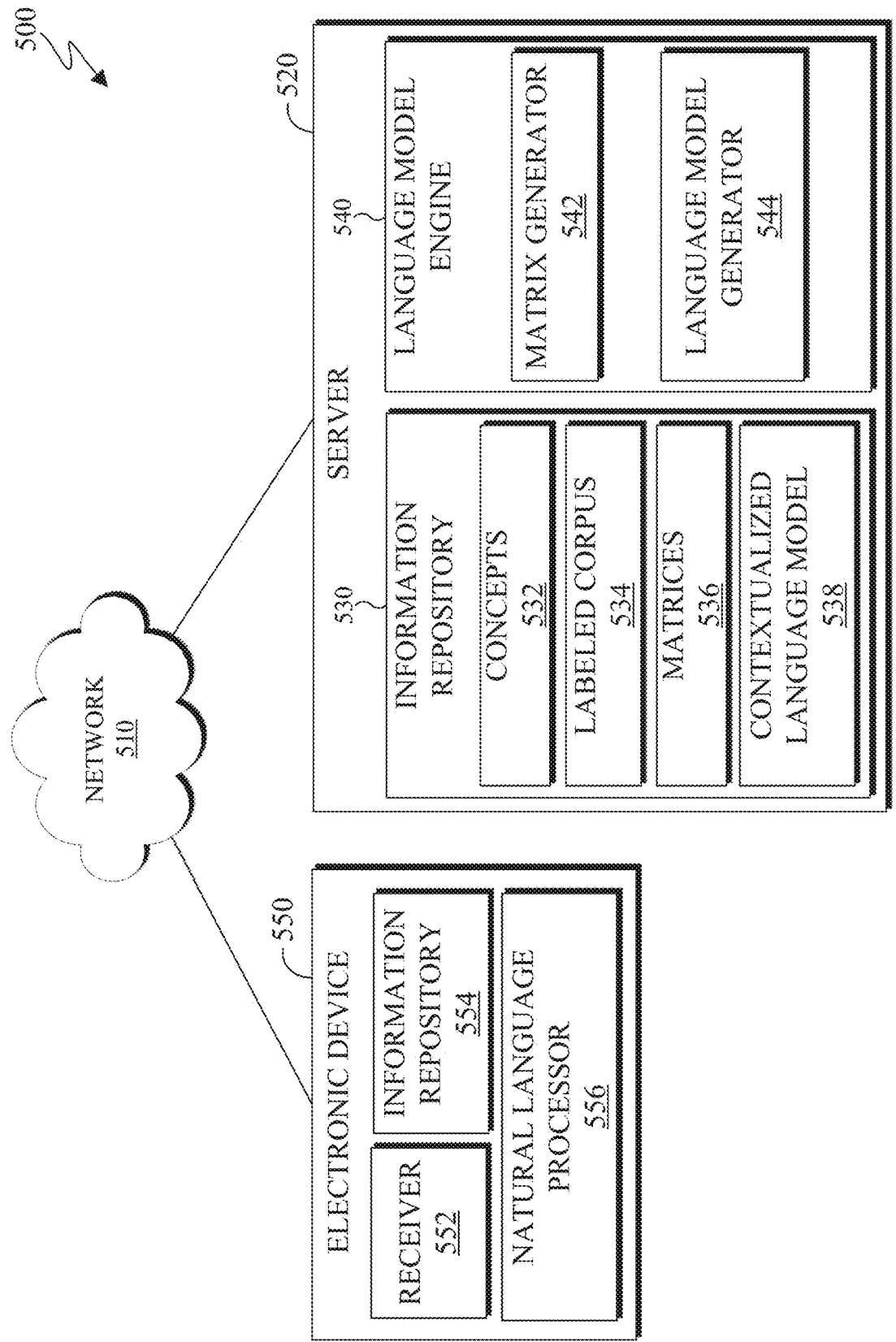
FIG. 5A illustrates an example natural language understanding system in accordance with an embodiment of this disclosure.

FIG. 5A illustrates an example NLU system 500 in accordance with an embodiment of this disclosure. For example, a portion of the NLU system 500 can be included in the intent spaces 400 of FIG. 4. The embodiment of the NLU system 500 shown in FIG. 5A is for illustration only. Other embodiments can be used without departing from the scope of this disclosure.

As shown in FIG. 5A, the NLU system 500 includes a server 520 and an electronic device 550 in communication over a network 510. The network 510 can be the same as or similar to the network 102 of FIG. 1. In some embodiments, the network 510 represents a "cloud" of computers interconnected by one or more networks, where the network is a computing system utilizing clustered computers and components that act as a single pool of seamless resources when accessed. Also, in some embodiments, the network 510 is connected with one or more servers (such as the server 104 of FIG. 1 and the server 520), one or more electronic devices (such as the client devices 106-114 of FIG. 1 and the electronic device 550). Further, in some embodiments, the network 510 can be connected to an information repository, such as a database, that contains a look-up tables and information pertaining to various language models.

In some embodiments, the server 520 can be implemented as shown in FIG. 2. In other embodiments, a portion of the components included in the server 520 can be included in different devices, such as multiple servers 104 or 200, multiple client devices 106-114, multiple electronic devices 300, or a combination of different devices. The server 520 can represent one or more local servers, one or more natural language processing servers, one or more speech recognition servers, or the like. The server 520 can be a web server, a server computer such as a management server, or any other electronic computing system capable of sending and receiving data. The server 520 can include an information repository 530 and a language model engine 540.

The information repository 530 represents any structure(s) capable of storing and facilitating retrieval of information (such as data, program code, or other suitable information on a temporary or permanent basis). The information repository 530 can represent the memory 230 of FIG. 2, possibly along with the persistent storage 235 of FIG. 2. The memory can be RAM or any other suitable volatile or non-volatile storage device(s), while persistent storage can contain one or more components or devices supporting longer-term storage of data, such as a ROM, hard drive, Flash memory, or optical disc. The information repository 530 can include a corpus of natural language inputs, such as one or more concepts 532 and labeled corpus 534. The information repository 530 can also include matrices 536 and a contextualized language model 538.

The corpus of natural language inputs including the one or more concepts 532 and labeled corpus 534 can be associated with any of the intent spaces 400 of FIG. 4. The concepts 532 include multiple synonym sets. Each synonym set includes words with similar meanings. In some embodiments, the concepts 532 can be separated by parts of grammar, such as nouns, verbs, adjectives, and the like. For example, the word "open" can include concepts such as "open," "show," "view," "display," and the like. As another example, the word "settings" can include concepts such as "settings," "options," "features," and the like. In some embodiments, the concepts 532 can include words that fall under a specific category. For example, the word "hardware" can include concepts such as "WI-FI," "global positioning system (GPS)," "BLUETOOTH," and the like.

The labeled corpus 534 includes various natural language inputs including verbal utterances that are associated with a label. For example, the labeled corpus 534 includes words with a labeled action (such as an action 450 of FIG. 4) or rule (such as a rule 460 of FIG. 4). In some embodiments, the label associated with a particular word is the lowest level of the respective levels of the intent spaces 400 that the word is associated with. The label indicates a particular set of instructions or class of instructions that an electronic device can execute in order to perform a natural language inputs. For instance, a particular label can be associated with the phrase "open BLUETOOTH settings." The label indicates an action 450 or rule 460 that instructs an electronic device to display a new window on a display of the electronic device that includes options associated with the BLUETOOTH hardware of the electronic device 550. As another example, another label can be associated with the phrase "open display options." Similarly, in yet another example, a particular label can be associated with the phrase "display GPS features."

As discussed in greater detail below with respect to the matrix generator 542, certain words that are included in the labeled corpus 534 can invoke different related words included within the concepts 532. For example, if the phrase "open BLUETOOTH settings" is labeled with a certain rule within the labeled corpus 534, the matrix generator 542 can relate the individual words of the phrase with other words from one or more synonym sets. For instance, the word "open" can indicate different synonyms from the concepts 532, such as the concepts of "open," "show," "view," and "display." Similarly, the word "settings" can indicate different synonyms from the concepts 532, such as the concepts of "options" and "features." As a result, the particular rule that is applied to the phrase "open BLUETOOTH settings" can be similarly applied to the phrases "show BLUETOOTH option," "display BLUETOOTH settings," "open BLUETOOTH options," and the like. As another example, the phrase "display GPS features," the word "display" can indicate different concepts from the concepts 532, such as the concepts of "open," "show," "view," and "display." Similarly, the words "GPS" and "features" can indicate different concepts from the concepts 532 within a single synonym set.

A word list, such as a matrix lexicon, is generated by the matrix generator 542 for each of the concepts 532 and the labeled corpus 534 that are related. For example, the word list is a collection of synonym sets with words from the labeled corpus that are related within one of the intent spaces 400.

Figure 6:
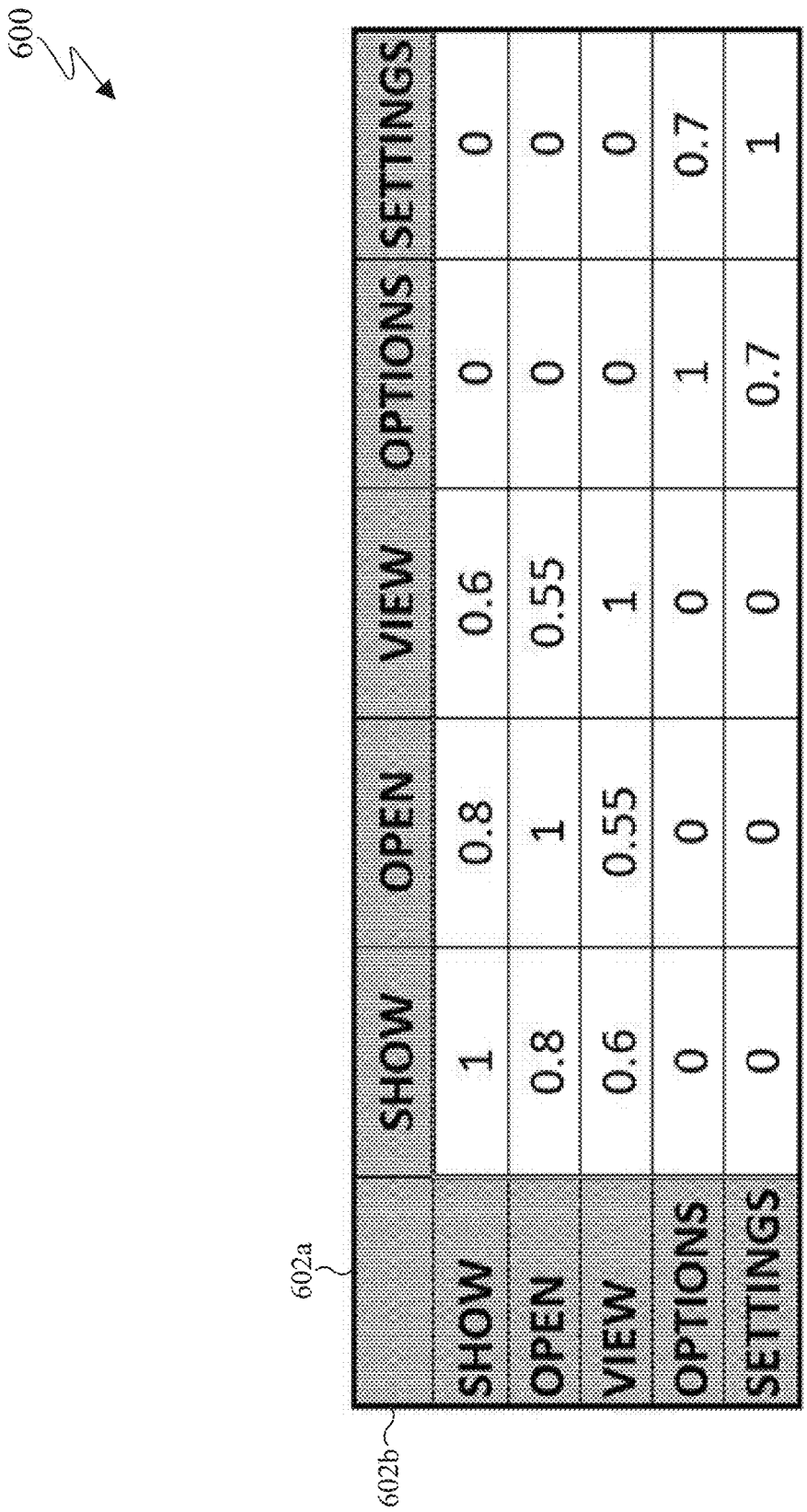
FIG. 6 illustrates an example representation of relatedness values in accordance with an embodiment of this disclosure.

As noted above, the information repository 530 can also include the multiple matrices 536. The matrices 536 are created by the matrix generator 542, and an example of the matrix 536 is shown in FIG. 6 (described below). The matrices 536 represent a word list that includes one or more synonym sets included in concepts 532. In some embodiments, each of the matrices 536 can include any number of synonym sets. The word list, as represented by one of the matrices 536, includes sets of words that are specific to one of the intent spaces 400. Each matrix 536 includes values that indicate the magnitude of relatedness between two words that are included in a word list. An axis of one of the matrices 536 can include the words of the word list. The words of the word list can be from one or more concepts 532, where each of the concepts 532 includes a synonym set. The value assigned to a word in a synonym set is based on the frequency that the word is used compared to other words in the synonym set. The value between two words is normalized with respect to a concept 532 within one of the intent spaces 400 of FIG. 4. Since the corpus of words changes with respect to each level of the intent spaces 400, the value that indicates the magnitude of relatedness between two words changes accordingly. For example, the same two words can have different values based on the particular level or tier of the intent spaces 400 that the synonym set is associated with. The matrices 536 can includes n dimensions, with each dimension comparing the relatedness value of two words in one or more synonym sets.

As noted above, the information repository 530 can also include a contextualized language model 538. In some embodiments, the contextualized language model 538 includes multiple language models. Also, in some embodiments, the contextualized language model 538 is included in an information repository that is associated with a particular electronic device, such as the information repository 554 of the electronic device 550. The contextualized language model 538 represents a language model that the natural language processor 556 can select based on the context of a received natural language input. The contextualized language model 538 enables the natural language processor to understand the received natural language input and instruct the electronic device 550 to perform the requested action. The contextualized language model 538 is based on one or more of the matrices 536. For example, since the matrices 536 relate similar words with a normalized value, the contextualized language model 538 is composed of different matrices that can be specific to the context of a received natural language input.

In some embodiments, the language model engine 540 includes a part of speech tagger (not shown). The part of speech tagger can tag words with different parts of speech or grammars, such as a noun, verb, adjective, adverb, pronoun, and the like. For example, a natural language input can use the same word multiple ways in a single input. For instance, in the phrase "text a text to mom saying hi," the word "text" when used the first time acts as a verb and when used the second time acts as a noun. The speech tagger can tag the first instance of "text" as a verb and tag the second instance of "text" as a noun. Tagging each instance of the word "text" with its respective grammar prevents different concepts that are associated with the word "text" within the same intent space from collapsing. Similarly, tagging each instance of the word "text" can assist a natural language processor (such as the natural language processor 556) in interpreting the intended action of the natural language input. For example, the second instance of the word "text" can indicate that the domain 430 is associated with messages. The first instance of the word "text" (when used as a verb) indicates the action 450 of typing a message "hi" and sending the message to the mother of the user, via a particular application 440 that can send text messages.

The language model engine 540 generates context-specific language models, such as the contextualized language model 538. The language model engine 540 includes the matrix generator 542 and a language model generator 544. The matrix generator 542 generates the matrices 536, where each matrix 536 represents a word list that includes one or more synonym sets based on one of the intent spaces 400 or a portion of one of the intent spaces 400. Each level of the intent spaces 400 can include a different corpus of natural language inputs compared to another level. Similarly, based on the context, each level of the intent spaces 400 can include a different corpus of natural language inputs. For example, if the domain 430 represents social media applications, the domain 430 can be associated with a certain corpus of natural language inputs. If the domain 430 represents gaming applications, the domain 430 can be associated with a different corpus of natural language inputs. As particular examples, words such as "tagging" and "posting" can be included in the corpus of natural language inputs when the domain 430 is social media and may not be included in the corpus of natural language inputs when the domain 430 is gamming.

In some embodiments, the matrix generator 542 calculates each word's frequency within a corpus of natural language inputs. For example, the matrix generator 542 can generate an n-dimensional matrix for the words included in the particular corpus of natural language inputs. Each column and row in the generated matrix includes words that are related, and all of the words in the generated matrix make up a word list. The matrix generator 542 can derive a value that indicates the degree of relatedness between each pair of words. The value that the matrix generator 542 assigns to a pair of words is based on comparing each word's frequency in the particular corpus of natural language inputs. The value is normalized based on the particular corpus of natural language inputs associated with the particular intent space 400. For example, the matrix generator 542 can normalize the words within a synonym set based on the frequency that each word is present within the corpus as compared to all other words in the corpus. The matrix generator 542 calculates the degree of relatedness between words within a particular context.

In some embodiments, the degree of relatedness between words can be determined using Equation (1) below.

$$\text{Relatedness Value} \left( \frac{tf_{w_1} + tf_{w_2}}{\sum tf_{w_n}} \right)_{c,i} \quad (1)$$

Equation (1) describes that the relatedness value between two words is based on the frequency with which the pair of words is found in a corpus of words. The variable $tf_w$ is the frequency of a term "w" in a concept "c" and an intent space "i." The concept represents one of the concepts 532, and the intent space represents one of the intent spaces 400. Together, the concept and the intent space define and limit the corpus of words selected to derive the term frequency. The particular concept of one level of the intent spaces 400 identifies the corpus of natural language inputs that Equation (1) analyzes when deriving relatedness values. For example, the numerator totals the frequency of two words within the particular concept, and the denominator totals all the words within the concept. The corpus of words can change based on the particular concept and the particular intent space under inspection. In some embodiments, one or more concepts associated with a particular intent space can be collected into a grammar. As shown in Equation (1) above, the relatedness value increases for a pair of words as each word appears more frequently in the same corpus. Words with a higher relatedness value are identified as being similar and therefore interchangeable. Each of the values can be referred to as a concept-share value, since each value represents a portion or share of the synonyms' conceptual space within a particular corpus of natural language inputs. Equation (1) expresses that the matrix generator 542 derives the frequency of each word that is associated with a particular concept 532, with respect to the total number of words within the particular concept 532. To find the level of similarity between two words in the particular concept 532, the term frequency of both of the words is added together and then divided by the sum of the term frequencies of all words in the concept 532. Relatedness values approaching a specified value (such as one) indicate that the pair of words is more related.

As an example, the matrix generator 542 can calculate the relatedness values between different terms that are included in one of the concepts 532, such as the word "hardware." As discussed above, the word "hardware" can include concepts such as "WI-FI," "GPS," and "BLUETOOTH." If the term "WI-FI" is found 102 times in the corpus, the term "GPS" is used 101 times in the corpus, and the term "BLUETOOTH" is used 104 times in the corpus, the term frequency between each of these three terms and the word "hardware" can be determined as shown in Equations (2), (3), and (4).

$$\frac{tf(WI-FI) + tf(GPS)}{tf(WI-FI + GPS + \text{BLUETOOTH})} = \frac{102 + 101}{102 + 101 + 104} = 0.661 \quad (2)$$

$$\frac{tf(WI-FI) + tf(\text{BLUETOOTH})}{tf(WI-FI + GPS + \text{BLUETOOTH})} = \frac{102 + 104}{102 + 101 + 104} = 0.671 \quad (3)$$

$$\frac{tf(\text{BLUETOOTH}) + tf(GPS)}{tf(WI-FI + GPS + \text{BLUETOOTH})} = \frac{104 + 101}{102 + 101 + 104} = 0.668 \quad (4)$$

Equation (2) calculates the relatedness value between "WI-FI" and "GPS," Equation (3) calculates the relatedness value between "WI-FI" and "BLUETOOTH," and Equation (4) calculates the relatedness value between "BLUETOOTH" and "GPS" within the concept 532 of "hardware." After deriving the relatedness value for each word within the concept 532 of "hardware," the matrix generator 542 can generate a matrix that represents the words.

As discussed above, a synonym set represents a set of words from one of the concepts 532, and multiple concepts 532 can be included in one of the intent spaces 400. In some embodiments, the matrix generator 542 generates a matrix that contains all of the synonym sets for a given intent space.

A word list or matrix lexicon refers to the words that compose a generated matrix. That is, a word list can include multiple synonym sets from multiple concepts 532 within one of the intent spaces 400. In order to generate a word list, the matrix generator 542 can extract pairs of words from the labeled corpus 534. The matrix generator 542 then derives relatedness values for the word pairs, such as by using Equation (1) above, and generates a matrix of words. Words in the generated matrix that have non-zero relatedness values can be from the same synonym set. Two words having a relatedness value of one indicates that the words are 100% related, which may occur when a word is compared against itself. Two words having a relatedness value of zero indicates that the words are not related, such as when words from different synonym sets are analyzed together. Two words having a relatedness value between zero and one indicates that the words are related, and the magnitude of the relationship between the words depends on the magnitude of the relatedness value.

In some embodiments, the relatedness values between pairs of words are normalized. For example, a relatedness value can be normalized based on the total number of related words in a given context (such as a particular concept and a particular intent space). As a particular example, the concepts 532 can include the frequency that each word is associated with a given concept. The matrix generator 542 can normalize the relatedness value between a pair of words, as the relatedness value represents a portion or share of the conceptual space, within a specific context. For a particular context, a specific corpus of words can be used to derive the relatedness value. As the context changes, the corpus of words changes, which then alters the degree of relatedness between the words.

In some embodiments, the matrix generator 542 updates the matrices 536 by modifying the relatedness values of word pairs. For example, when words are added or removed from the labeled corpus 534 or the concepts 532, the matrix generator 542 can update the word list. As a result of adding or removing words, the values that indicate relatedness between words pairs can change. Updating a synonym set can include modifying the relatedness values between words within a synonym set, adding new words with relatedness values into a synonym set, removing existing words of a synonym set, or a combination thereof.

Also, in some embodiments, the matrix generator 542 can modify or create new relatedness values for the pairs of words when the corpus of words changes with respect to changes to the context. For example, the corpus of words may change to reflect different levels of the intent spaces 400, where each lower level further defines a portion of the higher level. When the corpus of words changes to reflect different levels of the intent spaces 400, some words within the corpus can be removed, and the frequency associated with each word in the corpus changes, which cause the relatedness values to change. As a result, the matrix generator 542 can generate multiple matrices representing synonym sets based on the concepts that are associated with the different intent spaces 400. As discussed below, the language model generator 544 can create contextualized language models (such as the contextualized language models 538) based on each of the matrices 536, as each matrix represents words from a particular intent space. Similarly, the language model generator 544 can create the contextualized language model 538 by combining two or more of the matrices 536.

The language model generator 544 creates the contextualized language model 538 based on the matrices 536. For example, the language model generator 544 can combine one or more of the matrices 536 to generate one or more language models 538 that are based on a particular context. As a particular example, the matrix generator 542 can select a specific corpus of natural language inputs (based on concepts 532 and labeled corpus 534) for a given context to derive relatedness values between each word of the specific corpus of natural language inputs. The language model generator 544 then creates the contextualized language model 538 for the particular context. As the context changes, the corpus of words changes, which then alters the degree of relatedness between words.

In some embodiments, the language model generator 544 generates the contextualized language model 538 (context-specific language models) by ranking words with high relatedness values similarly. The rank (or weight) associated with words in a synonym set is based on the relatedness value between the words within the synonym set. As a result, a natural language processor 556 using the generated contextualized language model 538 is more likely to select a particular word than another word when deriving the intended meaning of a received natural language input. The rank associated with the words of the synonym set indicate that while some words can be contextually valid synonyms, lower-ranked words are used less frequently together than words with higher relatedness values.

As an example, based on term frequency in a particular context such as the domain 430 of messages, the words "transmit" and "send" when used in the phrases "transmit a message to Tom" and "send a message to Tom" could have a lower relatedness value as compared to the words "send" and "forward" when used in similar phrase. As another example, words like "post," "send," and "write" can be highly related with respect to one of the intent spaces 400, while the words "post," "tweet," and "tag" can be highly related with respect to another of the intent spaces 400.

In some embodiments, the language model generator 544 can generate two contextualized language models with the same word that has different meanings. For instance, if the domain 430 is associated with travel applications, the word "book" can be highly related to the words "schedule" and "purchase" (such as in the phrases "book a flight," "schedule a flight," and "purchase a flight") and have a zero relatedness score with the words "magazine" and "author." If the domain 430 is associated with entertainment or shopping, the word "book" can be highly related to the words "magazine" and "author" (as "book," "magazine," and "author" all relate to a written work that is made up of multiple bound pages) and have a zero relatedness score with the word "schedule."

In some embodiments, the language model generator 544 can create new language models by merging two or more matrices 536 based on the context associated with a particular input. The language model generator 544 can select certain matrices 536 to create a new contextualized language model 538. For example, when a new application is created or installed, the language model generator 544 can create a language model specific to the new application based on identifying the domain 430 that the new application falls within. The language model generator 544 can transfer portions of existing language models and associated rules to the new application within the same domain. Combining existing language models and matrices creates a scalable language model system. Thus, when two or more matrices 536 are combined, synonym sets for one or more existing applications can be merged to create a new word list for the new application. Creating a new word list from existing synonym sets allows the transfer of knowledge from a previous application to the new application.

In some embodiments, the electronic device 550 can represent one of the client devices 106-114 of FIG. 1, the electronic device 300 of FIG. 3, the device 420 of FIG. 4, an IOT device (such as a virtual assistant device), or other suitable device. In other embodiments, a portion of the components included in the electronic device 550 can be included in different devices, such as the server 520, multiple servers 104 or 200, multiple client devices 106-114, or other combination of different devices.

In this example, the electronic device 550 includes a receiver 552, an information repository 554, and a natural language processor 556. The electronic device 550 can receive natural language inputs through the receiver 552. For example, the electronic device 550 can receive a natural language input through the receiver 552. The received input can include a command from a user that instructs the electronic device 550 to perform a particular action. The receiver 552 represents any suitable component for receiving a natural language input, such as a verbal utterance through the microphone 320 of FIG. 3 or typed text through a keyboard. Example types of microphones that can be used here include a dynamic microphone, a condenser microphone, a piezoelectric microphone, or the like. The receiver 552 generally operates to receive sound waves (such as voice data) and convert the sound waves into electrical signals. The receiver 552 can also receive natural language inputs such as verbal utterances from another electronic device. For example, the other electronic device can include a speaker, such as the speaker 330 of FIG. 3, which propagates verbal utterances. As another example, the receiver 552 can receive wired or wireless signals that include a natural language input.

The information repository 554 can be the same as or similar to the information repository 530. The information repository 554 represents any suitable structure(s) capable of storing and facilitating retrieval of information (such as data, program code, or other suitable information on a temporary or permanent basis). The information repository 554 can include a memory and a persistent storage. The memory can be RAM or any other suitable volatile or non-volatile storage device(s), while the persistent storage can contain one or more components or devices supporting longer-term storage of data, such as a ROM, hard drive, Flash memory, or optical disc.

In some embodiments, the information repository 554 includes one or more contextualized language models, such as the contextualized language model 538, which is generated by the language model generator 544. If the information repository 554 includes one or more contextualized language models, the natural language processor 556 can locally select and access a particular contextualized language model based on the context of a received natural language input. In other embodiments, the natural language processor 556 selects a contextualized language model, such as the contextualized language model 538, from the server 520.

The natural language processor 556 derives the intent of the natural language input based on one or more contextualized language models. In this way, the natural language processor 556 allows a user to interact with the electronic device 550 through a natural language input, such as voice and speech, received by the receiver 552. For example, the natural language processor 556 can interpret a received natural language input from the receiver 552. After interpreting the received natural language input, the natural language processor 556 can then provide rules, such as the rule 460, to instruct to electronic device how to perform the received input. In some embodiments, the natural language processor 556 utilizes voice recognition, such as voice biometrics, to identify the user based on a voice pattern of the user in order to reduce, filter, or eliminate commands not originating from the user.

The natural language processor 556 can identify the context of a natural language input and then select a particular contextualized language model, such as the contextualized language model 538. For example, the natural language processor 556 can derive the context of a received natural language input based on relating the received input with one of the intent spaces 400. In some embodiments, the natural language processor 556 can identify the domain 430, the application 440, or the action 450 that is associated with the received input, such as a verbal utterance. Based on identifying the domain 430, application 440, or action 450 associated with the natural language input, the natural language processor 556 can select a particular contextualized language model that is particular to the specific context of the received natural language input based on one of the identified intent spaces 400. For example, the natural language processor 556 can identify an action 450 to perform as well as select a particular rule 460, which instructs the electronic device 550 to perform the particular action with respect to a particular application 440.

In some embodiments, the natural language processor 556 can interpret a received natural language input based on the selected contextualized language model 538. Since the same intended action can be spoken by a user using different words and phrase, it is possible that the language processor 556, based on the contextualized language model 538, may not understand the received natural language input or the contextualized language model 538 may not include a rule specific to the received input. Therefore, in some embodiments, the natural language processor 556 can determine that a natural language input does not include identifiable content. In other embodiments, the contextualized language model 538 can determine that a natural language input does not include identifiable content. In either case, the natural language processor 556 or the contextualized language model 538 can replace at least one of the words of the input with at least one other word when those words are related as indicated by at least one relatedness value. For example, if the natural language input is the phrase "transmit a message," the natural language processor 556 can replace the word "transmit" with the word "send," assuming the words "transmit" and "send" are related as indicated by the contextualized language model 538, and the phrase "send a message" may then be identifiable. After modifying the natural language input, the natural language processor 556 can derive an action to perform based on the contextualized language model 538.

Although FIG. 5A illustrates one example of the NLU system 500, various changes can be made to FIG. 5A. For example, any other suitable arrangement of the contextualized language model 538 and the language model engine 540 could be used in an electronic device 550.

Figure 5B:
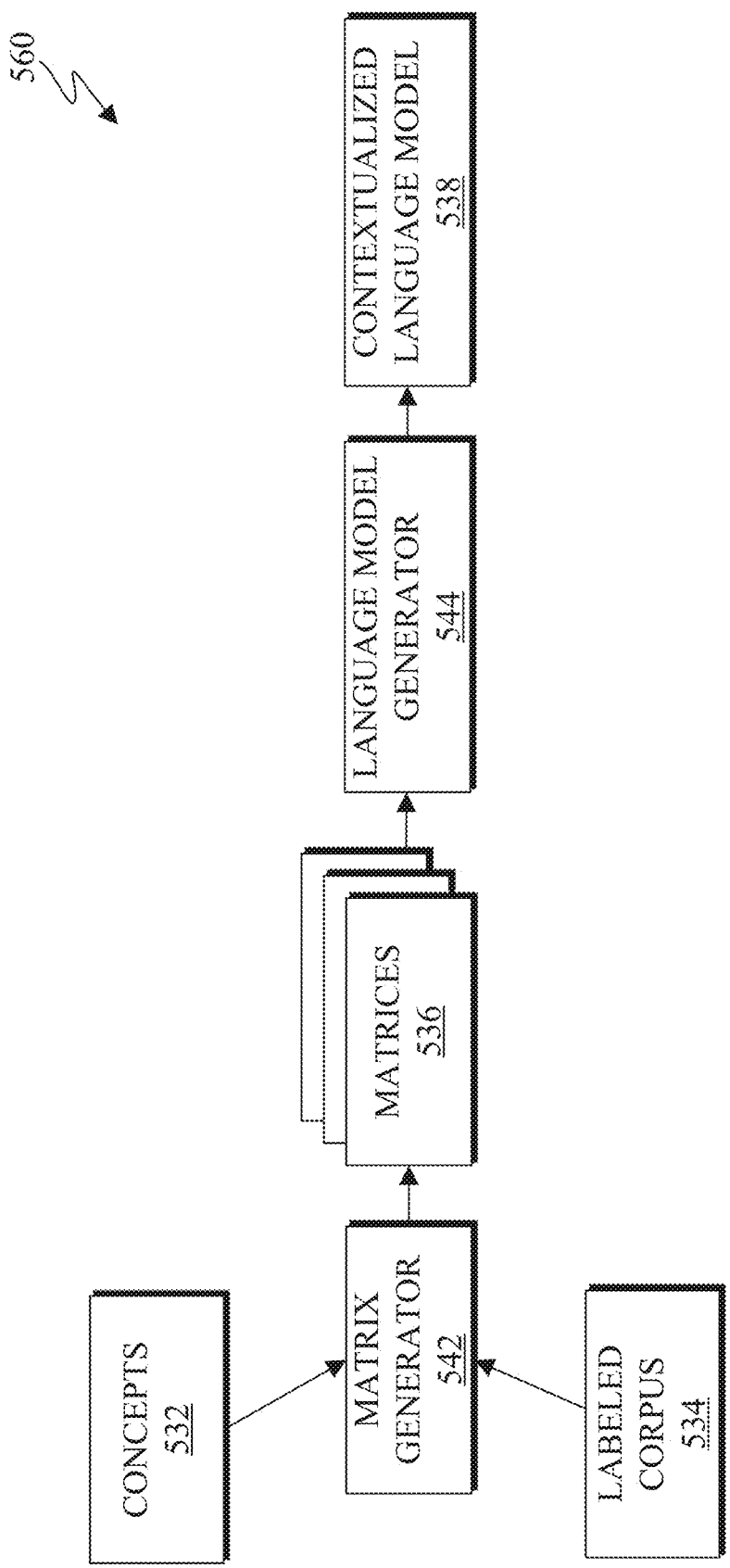
FIG. 5B illustrates an example process of generating a contextualized language model in accordance with an embodiment of this disclosure.

FIG. 5B illustrates an example process 560 of generating a contextualized language model 538 in accordance with an embodiment of this disclosure. The embodiment of the process 560 shown in FIG. 5B is for illustration only. Other embodiments can be used without departing from the scope of this disclosure.

As shown in FIG. 5B, the process 560 can be used to create one or more of the contextualized language models 538 of FIG. 5A. For example, the process 560 illustrates the creation of a contextualized language model 538 via the elements of the NLU system 500, such as the concepts 532, the labeled corpus 534, the matrix generator 542, the matrices 536, the language model generator 544, and the contextualized langue model 538.

The matrix generator 542 receives the concepts 532 and the labeled corpus 534. For example, the matrix generator 542 can receive a synonym set from a single concept 532 and words from the labeled corpus 534 that are related to the words of the concept 532. The matrix generator 542 creates one matrix 536 based on deriving the relatedness values between words, such as via Equation (1) above. For instance, the matrix generator 542 can generate one of the matrices 536 for each of the different concepts 532 and words from the labeled corpus 534. In some embodiments, one of the matrices 536 represents one of the concepts 532. In other embodiments, one of the matrices 536 represents multiple concepts 532. The language model generator 544 combines one or more of the matrices 536 together to generate a contextualized language model 538 for one of the intent spaces 400. For example, the contextualized language model 538 can be based on the combination of multiple matrices that represent one of the intent spaces 400.

Although FIG. 5B illustrates one example of a process 560 of generating a contextualized language model 538, various changes can be made to FIG. 5B. For example, while shown as a series of steps, various steps in FIG. 5B could overlap, occur in parallel, or occur any number of times.

FIG. 6 illustrates an example representation of relatedness values in accordance with an embodiment of this disclosure. In particular, FIG. 6 illustrates a matrix 600 representing the relatedness values between pairs of words in a synonym set. The matrix 600 could, for example, represent one of the matrices 536 of FIGS. 5A and 5B.

As shown in FIG. 6, the matrix 600 is made up of multiple columns and rows. A first column 602a identifies different words associated with the rows of the matrix 600, and a first row 602b identifies different words associated with the columns of the matrix 600. Each word included in the matrix 600 is specific to concepts 532 and included in one of the intent spaces 400. The words included in the matrix 600 form a word list that is made of two synonym sets. The first synonym set includes the words "show," "open," and "view," while the second synonym set includes the words "option" and "setting." Additionally, the cells of the matrix 600 (other than the first column 602a and the first row 602b) includes a relatedness value identifying the relatedness of the corresponding word in the first column 602a and the corresponding word in the first row 602b. These values could be derived using Equation (1) above. In this example, the words OPEN and SHOW have a relatedness value of 0.8, while the words SHOW and VIEW have a relatedness value of 0.6. Within the context represented by the matrix 600, the word OPEN is more related to the word SHOW than the word VIEW.

Although FIG. 6 illustrates one example of a representation of relatedness values, various changes may be made to FIG. 6. For example, the matrix 600 could include any suitable number of words along its rows and columns.

Figure 7:
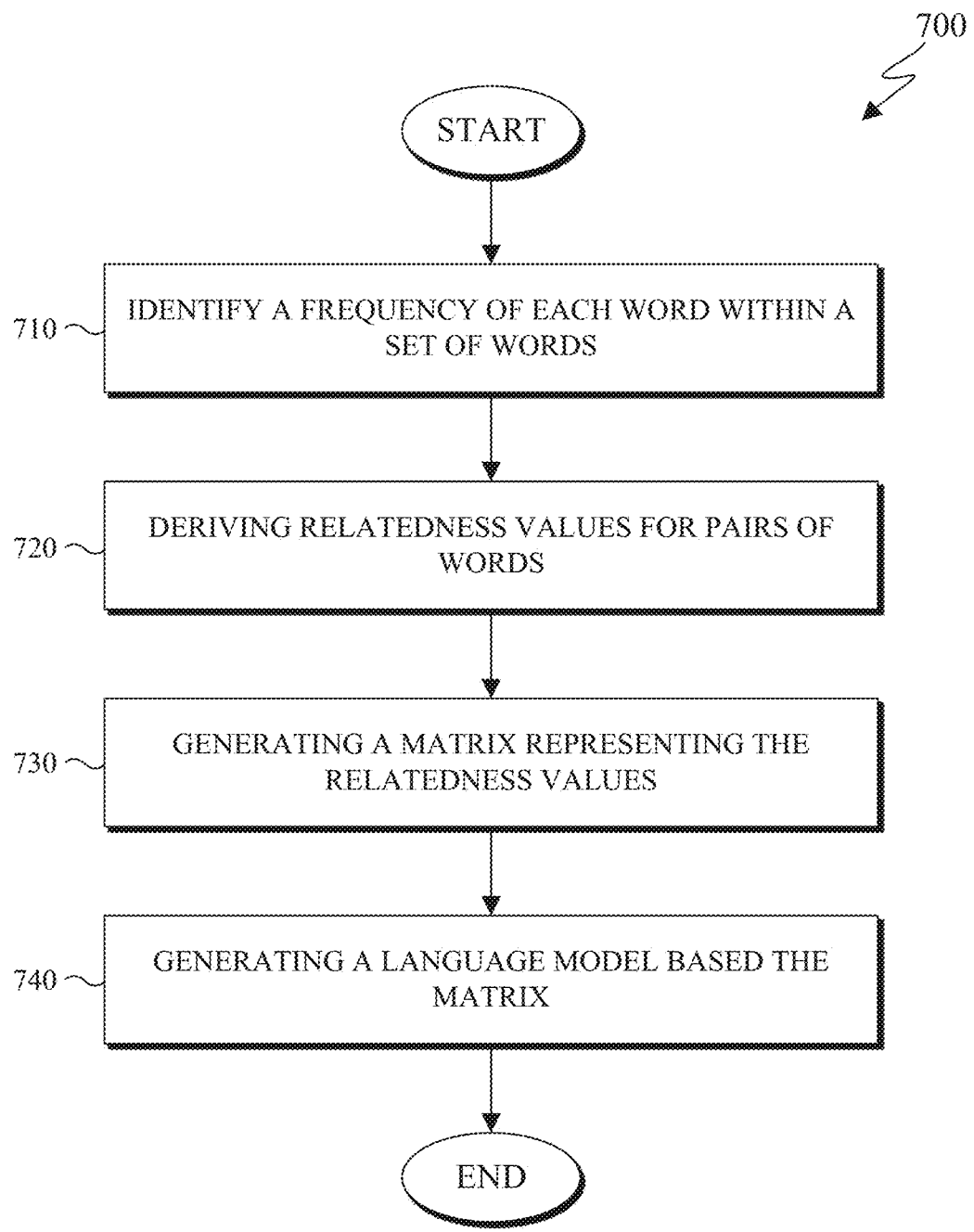
FIG. 7 illustrates an example method for creating a context-specific language model in accordance with an embodiment of this disclosure.

FIG. 7 illustrates an example method 700 for creating a context-specific language model in accordance with an embodiment of this disclosure. The method 700 may be performed by the server 104 or any of the client devices 106-114 of FIG. 1, the server 200 of FIG. 2, the electronic device 300 of FIG. 3, the electronic device 550 or the server 520 of FIG. 5A, or any other suitable device or system. For ease of explanation, the method 700 is described as being performed by the language model engine 540 of FIG. 5A.

In step 710, the language model engine 540 identifies a frequency of each word that is present within a set of words. The set of words can be identified from one of the intent spaces, such as one of the intent spaces 400. Each intent space can include a particular set of words, such as a particular corpus of natural language inputs. In some embodiments, the set of words can include multiple sets of words. For example, the set of words can represent words associated with the meta-device 410, while each lower level (such as the domain 430) can represent a particular portion or sub-portion of the set of words. Each of the multiple sets of words can include varying quantities of words based on the particular context. For example, the device 420 can include multiple domains, such as a first domain for social media, a second domain for gaming, and a third domain for travel. As such, the device 420 may include a corpus of words for each of the domains. A domain 430 then represents one of the three domains, and as such that domain 430 includes words specific to the domain 430 (which can be a portion of the words associated with the device 420).

In step 720, the language model engine 540 derives relatedness values for pairs of words. Each relatedness value corresponds to a particular pair of words from the set of words. The relatedness value of a pair of words is based on the identified frequencies that each word of the pair is present within the set of words. The relatedness value between two words indicates the extent to which the words are related. Pairs of words with higher relatedness values are more related than pairs of words with lower relatedness values, while a zero relatedness value between a pair of words indicates that those words are not related and can be included in different synonym sets.

In step 730, the language model engine 540 generates a matrix representing the relatedness values between pairs of words from the set of words. The matrix includes one or more synonym sets. Each of the synonym sets includes relatedness values that represent the degree of the relationship between pairs of words included within the synonym set. The synonym set can include words that are related as the words share a similar context, such as one of the intent spaces 400.

In step 740, the language model engine 540 generates at least one language model that represents the relationships between each word included in the matrix. Each contextualized language model can be based on the corpus of natural language inputs included in one of the intent spaces 400. Each language model can include the synonym set of the generated matrix, which enables the language model to be used to more accurately derive the intent of the natural language input.

Although FIG. 7 illustrates one example of a method 700 for creating a context-specific language model, various changes may be made to FIG. 7. For example, while shown as a series of steps, various steps in FIG. 7 could overlap, occur in parallel, or occur any number of times.

Figure 8:
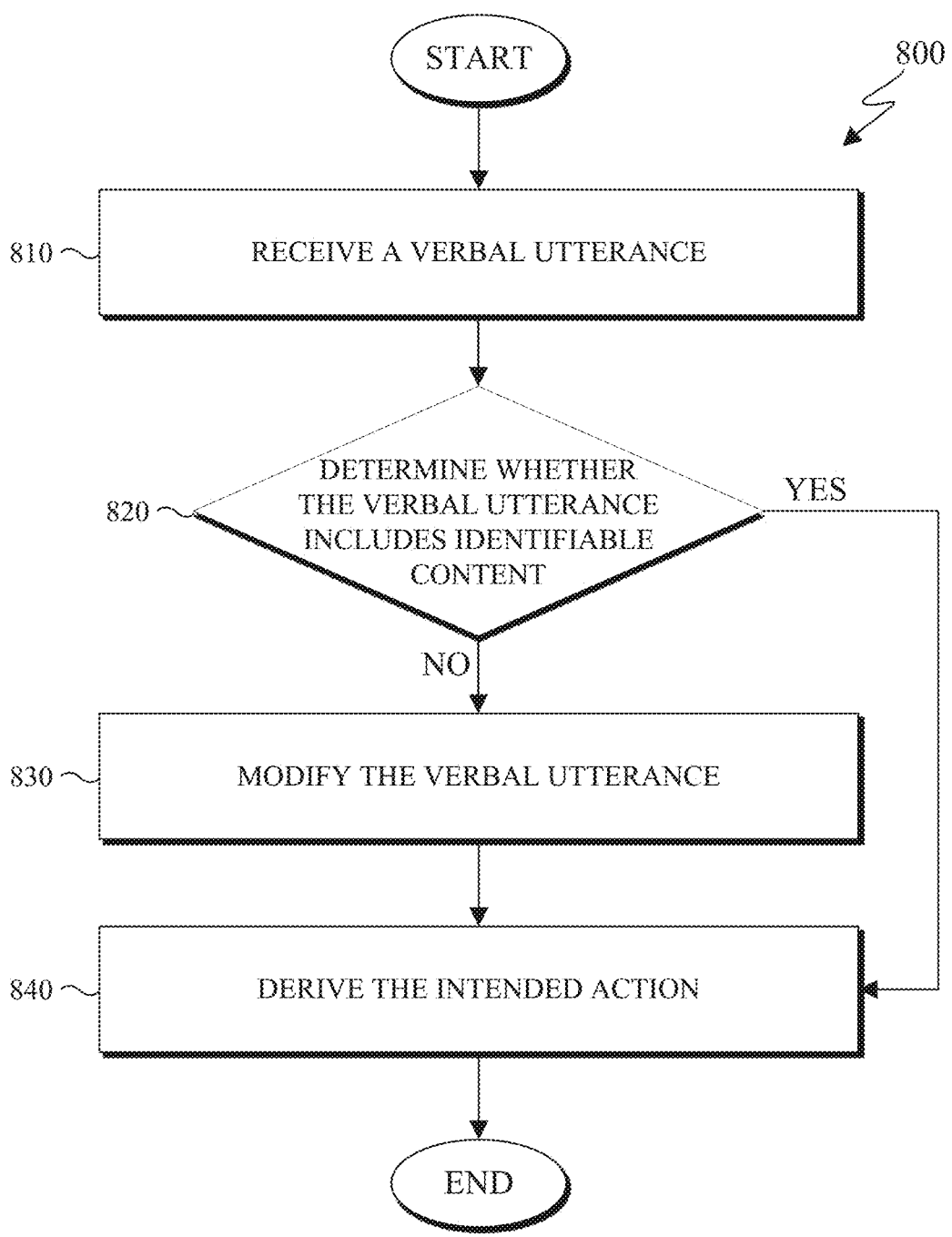
FIG. 8 illustrates an example method for modifying a verbal utterance in accordance with an embodiment of this disclosure.

FIG. 8 illustrates an example method 800 for modifying a natural language input in accordance with an embodiment of this disclosure. The method 800 may be performed by the server 104 or any of the client devices 106-114 of FIG. 1, the server 200 of FIG. 2, the electronic device 300 of FIG. 3, the electronic device 550 or the server 520 of FIG. 5A, or any other suitable device or system. For ease of explanation, the method 800 is described as being performed by the NLU system 500 of FIG. 5A.

In step 810, the electronic device 550 receives a natural language input, such as via its receiver 552. The natural language input can be a word or a string or words and includes a particular action that the electronic device 550 is to perform. In some embodiments, the natural language input is a verbal utterance that is spoken by a user.

In step 820, the natural language processor 556 determines whether the received natural language input includes identifiable content. In some embodiments, the natural language processor 556 can identify the context of the input and select a particular contextualized language model 538 that is based on the context. The context can be associated with one of the intent spaces 400. However, it is possible that the exact words forming the input are not included in the contextualized language model 538. In some embodiments, if the exact words forming the natural language input are not included in the contextualized language model 538, the natural language processor 556 determines that the input does not include identifiable content.

If the natural language input includes identifiable content, such as when the words or phrases that form the input are included in the contextualized language model 538, the natural language processor 556 continues to step 840. At step 840, the natural language processor 556 can derive the indented action of the natural language input. Thereafter, the contextualized language model 538 can provide a particular rule to the natural language processor 556, where the rule includes instructions as to how to perform the action. The natural language processor 556 can instruct the electronic device 550 to perform the action based on the particular rule included in the selected contextualized language model 538.

In some embodiments, if at least a portion of the words that form the natural language input are not included in the contextualized language model 538, the natural language processor 556 (or the contextualized language model 538) determines that the input includes non-identifiable content. For example, the input can be considered to include non-identifiable content if there is no action or rule included in the contextualized language model 538 associated with the natural language input.

In step 830, in response to determining that the input does not include identifiable content, the natural language processor 556 can modify the natural language input by modifying one or more words of the input. In some embodiments, the natural language processor 556 can replace one word included in the input with another word. The two words can be related based on both words sharing a relatedness value. The words can share a relatedness value when both words are included in a synonym set. In some embodiments, the contextualized language model 538 replaces one word included in the natural language input with another word when the two words are related. In some cases, multiple words in the input may be replaced.

After the natural language input is modified, in step 840, the natural language processor 556 derives the action to perform based on the modified input. For example, after modifying the natural language input, the natural language processor 556 using the contextualized language model 538 may derive the indented action of the received natural language input based on the modified input. Thereafter, the contextualized language model 538 can provide a particular rule to the natural language processor 556, where the rule includes instructions as to how to perform the action. The natural language processor 556 can instruct the electronic device 550 to perform the action based on the particular rule, thereby performing the intended action of the received natural language input.

Although FIG. 8 illustrates one example of a method 800 for modifying a natural language input, various changes may be made to FIG. 8. For example, while shown as a series of steps, various steps in FIG. 8 could overlap, occur in parallel, or occur any number of times.

Note that while various figures illustrate different examples of user equipment, various changes may be made to the user equipment. For example, the user equipment can include any number of each component in any suitable arrangement. In general, the figures do not limit the scope of this disclosure to any particular configuration(s) of user equipment. Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method comprising:
   selecting an intent space representing one of multiple hierarchical levels, each of the multiple hierarchical levels including a set of words associated with a context, wherein at least a portion of words in the set of words within each of the multiple hierarchical levels are synonyms;
   generating a word list from the set of words corresponding to the selected intent space, the word list including one or more concepts that are related to a set of labeled words with one or more corresponding actions;
   identifying a frequency of each word that is present within the word list;
   deriving relatedness values for pairs of words, each pair of words including a first word and a second word in the word list, each relatedness value corresponding to a respective one of the pairs of words, each relatedness value based on the identified frequencies that the first word and the second word of the respective pair of words are present within the word list;
   generating a matrix representing the relatedness values; and
   generating, from the word list, a language model for modifying one or more words of a natural language input corresponding to the context with at least one word from the word list that is labeled based on at least one of the relatedness values represented in the matrix;
   wherein the multiple hierarchical levels include at least one of: a rule level, an action level, an application level, a domain level, a device level, or a meta-device level.

2. The method of claim 1, wherein each relatedness value identifies an extent to which the first word and the second word of the respective pair of words are related within a synonym set.

3. The method of claim 1, wherein the word list comprises one or more synonym sets, each of the one or more synonym sets representing a portion of words from the word list having non-zero relatedness values.

4. The method of claim 1, further comprising:
identifying a synonym set from the word list; and
wherein deriving the relatedness values comprises, for each pair of words, identifying a degree of relatedness between the first word and the second word of the pair of words from the synonym set, the degree of relatedness based on the identified frequency of the first word, the identified frequency of the second word, and a total number of words included in the synonym set.

5. The method of claim 1, wherein:
the one or more concepts include multiple synonym sets having varying quantities of words; and
the method further comprises:
selecting another intent space that is associated with a different hierarchical level of the multiple hierarchical levels;
identifying a frequency of each word that is present within the other intent space;
modifying the relatedness values for the pairs of words that are included in each of the synonym sets included in the other intent space based on the identified frequency of each word that is present within the other intent space;
generating a new matrix that represents the modified relatedness values; and
generating a new language model based on the new matrix.

6. The method of claim 1, further comprising:
receiving the natural language input;
determining whether the natural language input includes identifiable content;
in response to determining that the natural language input does not include identifiable content, modifying the one or more words of the natural language input by replacing one word of the one or more words with another word that is included in the word list, wherein the one word and the other word are related based on the relatedness value of the one word and the other word; and
after modifying the natural language input, deriving an action to perform based on the modified natural language input.

7. The method of claim 1, wherein each of the multiple hierarchical levels is associated with a corpus of natural language inputs.

8. An electronic device comprising:
at least one processor configured to:
select an intent space representing one of multiple hierarchical levels, each of the multiple hierarchical levels including a set of words associated with a context, wherein at least a portion of words in the set of words within each of the multiple hierarchical levels are synonyms;
generate a word list from the set of words corresponding to the selected intent space, the word list including one or more concepts that are related to a set of labeled words with one or more corresponding actions;
identify a frequency of each word that is present within the word list;
derive relatedness values for pairs of words, each pair of words including a first word and a second word in the word list, each relatedness value corresponding to a respective one of the pairs of words, each relatedness value based on the identified frequencies that the first word and the second word of the respective pair of words are present within the word list;
generate a matrix representing the relatedness values; and
generate, from the word list, a language model for modifying one or more words of a natural language input corresponding to the context with at least one word from the word list that is labeled based on at least one of the relatedness values represented in the matrix;
wherein the multiple hierarchical levels include at least one of: a rule level, an action level, an application level, a domain level, a device level, or a meta-device level.

9. The electronic device of claim 8, wherein each relatedness value identifies an extent to which the first word and the second word of the respective pair of words are related within a synonym set.

10. The electronic device of claim 8, wherein the word list comprises one or more synonym sets, each of the one or more synonym sets representing a portion of words from the word list having non-zero relatedness values.

11. The electronic device of claim 8, wherein:
the at least one processor is configured to identify a synonym set from word list; and
to derive the relatedness values, the at least one processor is configured, for each pair of words, to identify a degree of relatedness between the first word and the second word of the pair of words from the synonym set, the degree of relatedness based on the identified frequency of the first word, the identified frequency of the second word, and a total number of words included in the synonym set.

12. The electronic device of claim 8, wherein:
the one or more concepts include multiple synonym sets having varying quantities of words; and
the at least one processor is further configured to:
select another intent space that is associated with a different hierarchical level of the multiple hierarchical levels;
identify a frequency of each word that is present within the other intent space;
modify the relatedness values for the pairs of words that are included in each of the synonym sets included in the other intent space based on the identified frequency of each word that is present within the other intent space;
generate a new matrix that represents the modified relatedness values; and
generate a new language model based on the new matrix.

13. The electronic device of claim 8, wherein the at least one processor is further configured to:
receive the natural language input;
determine whether the natural language input includes identifiable content;
in response to determining that the natural language input does not include identifiable content, modify the one or more words of the natural language input by replacing one word of the one or more words with another word that is included in the word list, wherein the one word and the other word are related based on the relatedness value of the one word and the other word; and after modifying the natural language input, derive an action to perform based on the modified natural language input.

14. The electronic device of claim 8, wherein each of the multiple hierarchical levels is associated with a corpus of natural language inputs.

15. A non-transitory machine-readable medium containing instruction that when executed cause at least one processor of an electronic device to:

select an intent space representing one of multiple hierarchical levels, each of the multiple hierarchical levels including a set of words associated with a context, wherein at least a portion of words in the set of words within each of the multiple hierarchical levels are synonyms;

generate a word list from the set of words corresponding to the selected intent space, the word list including one or more concepts that are related to a set of labeled words with one or more corresponding actions;

identify a frequency of each word that is present within the word list;

derive relatedness values for pairs of words, each pair of words including a first word and a second word in the word list, each relatedness value corresponding to a respective one of the pairs of words, each relatedness value based on the identified frequencies that the first word and the second word of the respective pair of words are present within the word list;

generate a matrix representing the relatedness values; and generate, from the word list, a language model for modifying one or more words of a natural language input corresponding to the context with at least one word from the word list that is labeled based on at least one of the relatedness values represented in the matrix;

wherein the multiple hierarchical levels include at least one of: a rule level, an action level, an application level, a domain level, a device level, or a meta-device level.

16. The non-transitory machine-readable medium of claim 15, wherein each relatedness value identifies an extent to which the first word and the second word of the respective pair of words are related within a synonym set.

17. The non-transitory machine-readable medium of claim 15, wherein the word list comprises one or more synonym sets, each of the one or more synonym sets representing a portion of words from the word list having non-zero relatedness values.

18. The non-transitory machine-readable medium of claim 15, wherein the instructions that when executed cause the at least one processor to derive the relatedness values comprise:

instructions that when executed cause the at least one processor to identify a synonym set from the word list; and instructions that when executed cause the at least one processor, for each pair of words, to identify a degree of relatedness between the first word and the second word of the pair of words from the synonym set, the degree of relatedness based on the identified frequency of the first word, the identified frequency of the second word, and a total number of words included in the synonym set.

19. The non-transitory machine-readable medium of claim 15, wherein:

the one or more concepts include multiple synonym sets having varying quantities of words; and the instructions when executed further cause the at least one processor to:

select another intent space that is associated with a different hierarchical level of the multiple hierarchical levels;

identify a frequency of each word that is present within the other intent space;

modify the relatedness values for the pairs of words that are included in each of the synonym sets included in the other intent space based on the identified frequency of each word that is present within the other intent space;

generate a new matrix that represents the modified relatedness values; and generate a new language model based on the new matrix.

20. The non-transitory machine-readable medium of claim 15, wherein the instructions when executed further cause the at least one processor to:

receive the natural language input;

determine whether the natural language input includes identifiable content;

in response to determining that the natural language input does not include identifiable content, modify the one or more words of the natural language input by replacing one word of the one or more words with another word that is included in the word list, wherein the one word and the other word are related based on the relatedness value of the one word and the other word; and after modifying the natural language input, derive an action to perform based on the modified natural language input.

* * * * *